(12) United States Patent
Baudry et al.

(10) Patent No.: US 10,410,316 B2
(45) Date of Patent: Sep. 10, 2019

(54) SYSTEM AND METHOD FOR BEAUTIFYING DIGITAL INK

(71) Applicant: MyScript, Nantes (FR)

(72) Inventors: Edgard Baudry, Nantes (FR); Bertrand Gourraud, Nantes (FR)

(73) Assignee: MyScript, Nantes (FR)

( * ) Notice: Subject to any disclaimer, the term of this patent is extended or adjusted under 35 U.S.C. 154(b) by 124 days.

(21) Appl. No.: 14/978,081

(22) Filed: Dec. 22, 2015

(65) Prior Publication Data
US 2017/0161866 A1 Jun. 8, 2017

(30) Foreign Application Priority Data

Dec. 8, 2015 (EP) .................................... 15290303

(51) Int. Cl.
G06T 3/00 (2006.01)
G06F 3/0488 (2013.01)
(Continued)

(52) U.S. Cl.
CPC ........ *G06T 3/0075* (2013.01); *G06F 3/04883* (2013.01); *G06K 9/00402* (2013.01); *G06K 9/222* (2013.01); *G06T 7/60* (2013.01)

(58) Field of Classification Search
CPC ............. G06F 3/04883; G06F 3/03545; G06F 3/0488; G06K 2209/01; G06K 9/222; G06K 9/00442; G06K 9/00402; G06K 9/32
See application file for complete search history.

(56) References Cited

U.S. PATENT DOCUMENTS 4,731,857 A 3/1988 Tappert
5,396,566 A 3/1995 Bruce et al.
(Continued)

FOREIGN PATENT DOCUMENTS

EP 0720084 7/1996

OTHER PUBLICATIONS

International Search Report for Related Application No. PCT/EP2016/001446, dated Nov. 29, 2016, EPO—International, WPI Data.

(Continued)

*Primary Examiner* — Jeffrey J Chow
(74) *Attorney, Agent, or Firm* — McDermott Will & Emery LLP

(57) ABSTRACT

A system, method and computer program product for use in beautifying digital ink of handwriting input to a computing device are provided. The computing device is connected to an input device in the form of an input surface. A user is able to provide input by applying pressure to or gesturing above the input surface using either his or her finger or an instrument such as a stylus or pen. The present system and method monitors the input strokes. The computing device further has a processor and at least one application for recognizing the handwriting input under control of the processor. The at least one system application is configured to cause display of the digital ink, determine from geometrical information of the handwriting input determined through the recognition of the handwriting input and geometrical information of an alignment structure of the display interface, a structuring transformation of the digital ink, and cause display of transformed digital ink in accordance with the structuring transformation.

9 Claims, 12 Drawing Sheets

(51) Int. Cl.
  *G06K 9/00* (2006.01)
  *G06T 7/60* (2017.01)
  *G06K 9/22* (2006.01)

(56) References Cited

U.S. PATENT DOCUMENTS

| | | | |
|---|---|---|---|
| 5,850,477 A * | 12/1998 | Takada | G06F 3/04883 |
| | | | 382/186 |
| 5,953,735 A * | 9/1999 | Forcier | G06F 3/0488 |
| | | | 715/273 |
| 6,408,092 B1 | 6/2002 | Sites | |
| 7,137,077 B2 * | 11/2006 | Iwema | G06F 3/0481 |
| | | | 715/863 |
| 7,284,200 B2 | 10/2007 | Bernstein et al. | |
| 7,751,623 B1 | 7/2010 | Simmons et al. | |
| 8,879,845 B2 * | 11/2014 | Rowley | G06F 3/017 |
| | | | 345/179 |
| 2007/0003142 A1 | 1/2007 | Simard et al. | |
| 2009/0161958 A1 * | 6/2009 | Markiewicz | G06F 3/0237 |
| | | | 382/186 |
| 2010/0309131 A1 | 12/2010 | Clary | |
| 2014/0300609 A1 * | 10/2014 | Kang | G06F 3/04883 |
| | | | 345/467 |
| 2016/0147723 A1 * | 5/2016 | Lee | G06F 17/242 |
| | | | 715/268 |
| 2016/0292501 A1 * | 10/2016 | Higashi | G06T 7/73 |
| 2017/0103046 A1 * | 4/2017 | Schroder | G06F 17/214 |

OTHER PUBLICATIONS

"MyScript—The Power of Handwriting", Dec. 11, 2014, pp. 1-3. URL: https://www.youtube.com/watch?v=yojFiBhPMUo.
International Search Report for related International Patent Application No. PCT/EP2016/002046, dated Feb. 2, 2017.
Improving Offline Handwritten Text Recognition with Hybrid HMM/ANN Models, IEEE Transactions on Pattern Analysis and Machine Intelligence, vol. 33, No. 4, Apr. 2011.
International Search Report issued for PCT/EP2016/002046 dated Apr. 24, 2017.
Written Opinion of the International Searching Authority issued for PCT/EP2016/002046 dated Apr. 24, 2017.

* cited by examiner

SYSTEM AND METHOD FOR BEAUTIFYING DIGITAL INK

CROSS REFERENCE TO RELATED APPLICATIONS

This application claims priority to European Application No. 15 290 303.5 filed on Dec. 8, 2015, the entire contents of which is incorporated herein.

TECHNICAL FIELD

The present description relates generally to the field of handwriting recognition systems and methods using computing device interfaces. The present description relates more specifically to systems and methods for beautifying digital ink rendered from handwriting input to such computing device interfaces and providing editing of the digital ink on the computing device interfaces.

BACKGROUND

Computing devices continue to become more ubiquitous to daily life. They take the form of computer desktops, laptop computers, tablet computers, hybrid computers (2-in-1s), e-book readers, mobile phones, smartphones, wearable computers (including smartwatches, smart glasses/headsets), global positioning system (GPS) units, enterprise digital assistants (EDAs), personal digital assistants (PDAs), game consoles, and the like. Further, computing devices are being incorporated into vehicles and equipment, such as cars, trucks, farm equipment, manufacturing equipment, building environment control (e.g., lighting, HVAC), and home and commercial appliances.

Computing devices generally consist of at least one processing element, such as a central processing unit (CPU), some form of memory, and input and output devices. The variety of computing devices and their subsequent uses necessitate a variety of interfaces and input devices. One such input device is a touch sensitive surface such as a touch screen or touch pad wherein user input is received through contact between the user's finger or an instrument such as a pen or stylus and the touch sensitive surface. Another input device is an input surface that senses gestures made by a user above the input surface. A further input device is a position detection system which detects the relative position of either touch or non-touch interactions with a non-touch physical or virtual surface. Any of these methods of input can be used generally for drawing or inputting text. When user input is text the user's handwriting is interpreted using a handwriting recognition system or method.

One application of handwriting recognition in non-portable and portable computing devices, such as smartphones, phablets and tablets, is for the input of text into various applications run by the computing devices in a manner similar to that traditionally done with keyboard, either physical or virtual. However, unlike keyboard input which is governed by strict layout rules, such as text entry on visible or invisible lines in accordance with the position of a displayed cursor, handwriting can be input virtually anywhere on the input surface of the device. While this substantially unconstrained input has some effect on the recognition accuracy of the handwriting, currently available advanced recognition algorithms are generally able to deal with such relatively 'free' positioning of textual characters.

Of more effect is a user's ability to interact with the input once it has been rendered as so-called 'digital ink' on the display. This is because, unlike typed or 'typeset ink' text which has characters relatively located in a uniform and known manner, the characters of the digital ink text are not uniform or in relatively known positions, generally due to the irregularity inherent in handwriting. Accordingly, conventional systems and methods typically only allow further interaction to be made on the typeset ink rendered from the recognized text, which is generally done at a different position of the display from the area where input is allowed.

It is desired by users however to be able to interact directly with the handwriting as well, such as to edit the input (e.g., add or delete characters or words), so that the creative flow of handwriting input is maintained. Some available applications provide alignment and scaling of the digital ink through normalization and the like. However, these do not take into account certain geometrical features of the handwriting and therefore the scaling and aligning is not properly performed to allow full interaction or faithful reproduction of the original digital ink. Further, they do not use recognition to provide these operations, and as such do not provide interaction capabilities within the input signal. Accordingly, editing operations can only be performed at the word level, and not at the character level, for example.

SUMMARY

The examples of the present invention that are described herein below provide systems and methods for beautifying and providing editing of digital ink on computing devices.

In one example, the present invention includes a system for beautifying digital ink on computing devices. Each computing device may include a processor and at least one non-transitory computer readable medium for recognizing handwriting input under control of the processor. The non-transitory computer readable medium may be configured to cause display of, on a display interface of a computing device, first digital ink in accordance with the handwriting input, determine, from first geometrical information of the handwriting input determined through the recognition of the handwriting input and second geometrical information of an alignment structure of the display interface, a structuring transformation of the first digital ink, and cause display of, on the display interface, second digital ink in accordance with the structuring transformation.

The structuring transformation may be determined from at least two comparisons of the first and second geometrical information. The at least two comparisons may provide first and second ratio values of the first and second geometrical information and the structuring transformation is determined from the minimum of the first and second ratio values.

The structuring transformation may scale the first digital ink to produce the second digital ink. The structuring transformation may align the first digital ink with the alignment structure to produce the second digital ink. The alignment structure may be a line pattern.

In another example, the present invention includes a method for beautifying digital ink on computing devices. Each computing device may include a processor and at least one non-transitory computer readable medium for recognizing handwriting input under control of the processor. The method may include the steps of displaying, on a display interface of a computing device, first digital ink in accordance with the handwriting input, determining, from geometrical information of the handwriting input determined through the recognition of the handwriting input, a structuring transformation of the first digital ink, and displaying, on the display interface, second digital ink in accordance with the structuring transformation.

The method may determine the structuring transformation from at least two comparisons of the first and second geometrical information. The at least two comparisons may provide first and second ratio values of the first and second geometrical information and the method may determine the structuring transformation from the minimum of the first and second ratio values.

The structuring transformation may scale the first digital ink to produce the second digital ink. The structuring transformation may align the first digital ink with the alignment structure to produce the second digital ink. The alignment structure may be a line pattern.

In another example, the present invention includes a non-transitory computer readable medium having a computer readable program code embodied therein. The computer readable program code may be adapted to be executed to implement a method for beautifying digital ink on a computing device. The computing device may include a processor and at least one system non-transitory computer readable medium for recognizing handwriting input under control of the processor. The method may include the steps of displaying, on a display interface of a computing device, first digital ink in accordance with the handwriting input, determining, from geometrical information of the handwriting input determined through the recognition of the handwriting input, a structuring transformation of the first digital ink, and displaying, on the display interface, second digital ink in accordance with the structuring transformation.

The method may determine the structuring transformation from at least two comparisons of the first and second geometrical information. The at least two comparisons may provide first and second ratio values of the first and second geometrical information and the method may determine the structuring transformation from the minimum of the first and second ratio values.

The structuring transformation may scale the first digital ink to produce the second digital ink. The structuring transformation may align the first digital ink with the alignment structure to produce the second digital ink. The alignment structure may be a line pattern.

In another example, the present invention includes a system for providing editing of digital ink on computing devices. Each computing device may include a processor and at least one non-transitory computer readable medium for recognizing handwriting input under control of the processor. The non-transitory computer readable medium may be configured to cause display of, on a display interface of a computing device, digital ink in accordance with the handwriting input, determine, from segmentation information of the handwriting input determined through the recognition of the handwriting input, ranges of elements of the digital ink, and cause display of, on the display interface, an input cursor in relation to the determined digital ink element ranges.

The elements of the digital ink may include text characters and the at least one non-transitory computer readable medium may be configured to display the input cursor at a position between first and second characters in relation to the determined ranges of the first and second characters.

The determined ranges of the first and second characters may overlap, and the at least one non-transitory computer readable medium may be configured to compare geometrical features of the determined ranges of the first and second characters, and cause the display of the input cursor on a border of the determined range of the first character or the determined range of the second character within the region of overlap in accordance with the comparison. The geometrical features may include height and width of the determined ranges.

In another example, the present invention includes a method for providing editing of digital ink on computing devices. Each computing device may include a processor and at least one non-transitory computer readable medium for recognizing handwriting input under control of the processor. The method may include the steps of displaying, on a display interface of a computing device, digital ink in accordance with the handwriting input, determining, from segmentation information of the handwriting input determined through the recognition of the handwriting input, ranges of elements of the digital ink, and displaying, on the display interface, an editing cursor in relation to the determined digital ink element ranges.

The elements of the digital ink may include text characters and the method may display the input cursor at a position between first and second characters in relation to the determined ranges of the first and second characters.

The determined ranges of the first and second characters may overlap, and the method may compare geometrical features of the determined ranges of the first and second characters, and display the input cursor on a border of the determined range of the first character or the determined range of the second character within the region of overlap in accordance with the comparison. The geometrical features may include height and width of the determined ranges.

In another example, the present invention includes a non-transitory computer readable medium having a computer readable program code embodied therein. The computer readable program code may be adapted to be executed to implement a method for providing editing of digital ink on a computing device. The computing device may include a processor and at least one system non-transitory computer readable medium for recognizing handwriting input under control of the processor. The method may include the steps of displaying, on a display interface of a computing device, digital ink in accordance with the handwriting input, determining, from segmentation information of the handwriting input determined through the recognition of the handwriting input, ranges of elements of the digital ink, and displaying, on the display interface, an editing cursor in relation to the determined digital ink element ranges.

The elements of the digital ink may include text characters and the method may display the input cursor at a position between first and second characters in relation to the determined ranges of the first and second characters.

The determined ranges of the first and second characters may overlap, and the method may compare geometrical features of the determined ranges of the first and second characters, and display the input cursor on a border of the determined range of the first character or the determined range of the second character within the region of overlap in accordance with the comparison. The geometrical features may include height and width of the determined ranges.

BRIEF DESCRIPTION OF THE DRAWINGS

The present system and method will be more fully understood from the following detailed description of the examples thereof, taken together with the drawings. In the drawings like reference numerals depict like elements. In the drawings.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference to and discussion of directional features such as up, down, above, below, lowest, highest, horizontal, vertical, etc., are made with respect to the Cartesian coordinate system as applied to the input surface on which the input to be recognized is made. Further, terms such as left and right are made in relation to the reader's frame of reference when viewing the drawings. Furthermore, the use of the term 'text' in the present description is understood as encompassing all alphanumeric characters, and strings thereof, in any written language and common place non-alphanumeric characters, e.g., symbols, used in written text. Further still, the examples shown in these drawings are in a left-to-right written language context, and therefore any reference to positions can be adapted for written languages having different directional formats.

The various technologies described herein generally relate to capture, processing and management of hand-drawn and handwritten content on portable and non-portable computing devices in a manner which retains the inputted style of the content while allowing conversion to a faithful typeset or beautified version of that content. The systems and methods described herein may utilize recognition of users' natural writing and drawing styles input to a computing device via an input surface, such as a touch sensitive screen, connected to, or of, the computing device or via an input device, such as a digital pen or mouse, connected to the computing device or via a physical or virtual surface monitored by a position detection system. Whilst the various examples are described with respect to recognition of handwriting input using so-called online recognition techniques, it is understood that application is possible to other forms of input for recognition, such as offline recognition in which images rather than digital ink are recognized. The terms hand-drawing and handwriting are used interchangeably herein to define the creation of digital content by users through use of their hands either directly onto a digital or digitally connected medium or via an input tool, such as a hand-held stylus. The term "hand" is used herein to provide concise description of the input techniques, however the use of other parts of a users' body for similar input is included in this definition, such as foot, mouth and eye.

Figure 1:
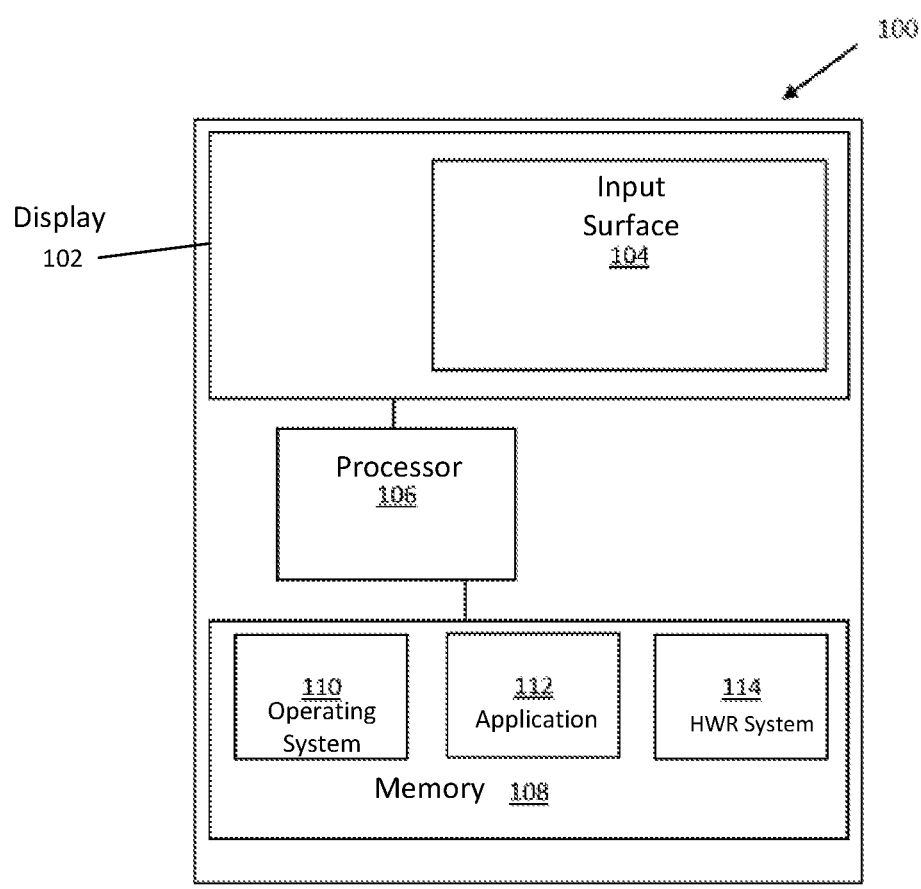
FIG. 1 shows a block diagram of a computing device in accordance with an example of the present system and method.

FIG. 1 shows a block diagram of an example computing device 100. The computing device may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device 100 includes components of at least one processing element, some form of memory and input and/or output (I/O) devices. The components communicate with each other through inputs and outputs, such as connectors, lines, buses, cables, buffers, electromagnetic links, networks, modems, transducers, IR ports, antennas, or others known to those of ordinary skill in the art.

The computing device 100 has at least one display 102 for outputting data from the computing device such as images, text, and video. The display 102 may use LCD, plasma, LED, iOLED, CRT, or any other appropriate technology that is or is not touch sensitive as known to those of ordinary skill in the art. At least some of the display 102 may be co-located with at least one input surface 104. The input surface 104 may employ technology such as resistive, surface acoustic wave, capacitive, infrared grid, infrared acrylic projection, optical imaging, dispersive signal technology, acoustic pulse recognition, or any other appropriate technology as known to those of ordinary skill in the art to receive user input. The input surface 104 may be bounded by a permanent or video-generated border that clearly identifies its boundaries.

In addition to the input surface 104, the computing device 100 may include one or more additional I/O devices (or peripherals) that are communicatively coupled via a local interface. The additional I/O devices may include input devices such as a keyboard, mouse, scanner, microphone, touchpads, bar code readers, laser readers, radio-frequency device readers, or any other appropriate technology known to those of ordinary skill in the art. Further, the I/O devices may include output devices such as a printer, bar code printers, or any other appropriate technology known to those of ordinary skill in the art. Furthermore, the I/O devices may include communications devices that communicate both inputs and outputs such as a modulator/demodulator (modem; for accessing another device, system, or network), a radio frequency (RF) or other transceiver, a telephonic interface, a bridge, a router, or any other appropriate technology known to those of ordinary skill in the art. The local interface may have additional elements to enable communications, such as controllers, buffers (caches), drivers, repeaters, and receivers, which are omitted for simplicity but known to those of skill in the art. Further, the local interface may include address, control, and/or data connections to enable appropriate communications among the other computer components.

The computing device 100 also includes a processor 106, which is a hardware device for executing software, particularly software stored in the memory 108. The processor can be any custom made or commercially available general purpose processor, a central processing unit (CPU), a semiconductor based microprocessor (in the form of a microchip or chipset), a macroprocessor, microcontroller, digital signal processor (DSP), application specific integrated circuit (ASIC), field programmable gate array (FPGA) or other programmable logic device, discrete gate or transistor logic, discrete hardware components, state machine, or any combination thereof designed for executing software instructions known to those of ordinary skill in the art. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., a 68xxx series microprocessor from Motorola Corporation, DSP microprocessors, or ARM microprocessors.

The memory 108 can include any one or a combination of volatile memory elements (e.g., random access memory (RAM, such as DRAM, SRAM, or SDRAM)) and nonvolatile memory elements (e.g., ROM, EPROM, flash PROM, EEPROM, hard drive, magnetic or optical tape, memory registers, CD-ROM, WORM, DVD, redundant array of inexpensive disks (RAID), another direct access storage device (DASD)). Moreover, the memory 108 may incorporate electronic, magnetic, optical, and/or other types of storage media. The memory 108 can have a distributed architecture where various components are situated remote from one another but can also be accessed by the processor 106. Further, the memory 108 may be remote from the device, such as at a server or cloud-based system, which is remotely accessible by the computing device 100. The memory 108 is coupled to the processor 106, so the processor 106 can read information from and write information to the memory 108. In the alternative, the memory 108 may be integral to the processor 106. In another example, the processor 106 and the memory 108 may both reside in a single ASIC or other integrated circuit.

The software in the memory 108 includes an operating system 110 and an application 112. The software optionally further includes a handwriting recognition (HWR) system 114 which may each include one or more separate computer programs. Each of these has an ordered listing of executable instructions for implementing logical functions. The operating system 110 controls the execution of the application 112 (and the HWR system 114). The operating system 110 may be any proprietary operating system or a commercially available operating system, such as WEBOS, WINDOWS®, MAC and IPHONE OS®, LINUX, and ANDROID. It is understood that other operating systems may also be utilized.

The application 112 includes one or more processing elements related to detection, management and treatment of user input (discussed in detail later). The software may also include one or more other applications related to handwriting recognition, different functions, or both. Some examples of other applications include a text editor, telephone dialer, contacts directory, instant messaging facility, computer-aided design (CAD) program, email program, word processing program, web browser, and camera. The application 112, and the other applications, include program(s) provided with the computing device 100 upon manufacture and may further include programs uploaded or downloaded into the computing device 100 after manufacture.

The HWR system 114, with support and compliance capabilities, may be a source program, executable program (object code), script, application, or any other entity having a set of instructions to be performed. When a source program, the program needs to be translated via a compiler, assembler, interpreter, or the like, which may or may not be included within the memory, so as to operate properly in connection with the operating system. Furthermore, the handwriting recognition system with support and compliance capabilities can be written as (a) an object oriented programming language, which has classes of data and methods; (b) a procedure programming language, which has routines, subroutines, and/or functions, for example but not limited to C, C++, Pascal, Basic, Fortran, Cobol, Perl, Java, Objective C, Swift, and Ada; or (c) functional programing languages for example but no limited to Hope, Rex, Common Lisp, Scheme, Clojure, Racket, Erlang, OCaml, Haskell, Prolog, and F#. Alternatively, the HWR system 114 may be a method or system for communication with a handwriting recognition system remote from the device, such as server or cloud-based system, but is remotely accessible by the computing device 100 through communications links using the afore-mentioned communications I/O devices of the computing device 100. Further, the application 112 and the HWR system 114 may operate together or be combined as a single application.

Strokes entered on or via the input surface 104 are processed by the processor 106 as digital ink. A user may enter a stroke with a finger or some instrument such as a pen or stylus suitable for use with the input surface. The user may also enter a stroke by making a gesture above the input surface 104 if technology that senses motions in the vicinity of the input surface 104 is being used, or with a peripheral device of the computing device 100, such as a mouse or joystick. A stroke is characterized by at least the stroke initiation location, the stroke termination location, and the path connecting the stroke initiation and termination locations. Because different users may naturally write the same object, e.g., a letter, a shape, a symbol, with slight variations, the HWR system accommodates a variety of ways in which each object may be entered whilst being recognized as the correct or intended object.

Figure 2:
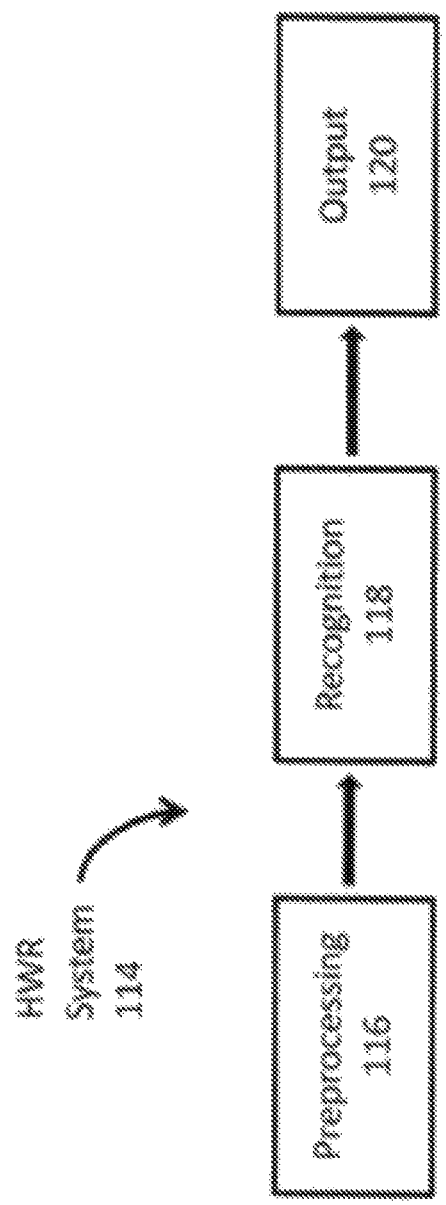
FIG. 2 shows a block diagram of a system for handwriting recognition in accordance with an example of the present system and method.

FIG. 2 is a schematic pictorial of an example of the HWR system 114, in either its local (i.e., loaded on the device 100) or remote (i.e., remotely accessible by the device 100) forms. The HWR system 114 includes stages such as preprocessing 116, recognition 118 and output 120. The preprocessing stage 116 processes the digital ink to achieve greater accuracy and reducing processing time during the recognition stage 118. This preprocessing may include normalizing of the path connecting the stroke initiation and termination locations by applying size normalization and/or methods such as B-spline approximation to smooth the input. The preprocessed strokes are then passed to the recognition stage 118 which processes the strokes to recognize the objects formed thereby. The recognized objects are then output 120 to the display 102 generally as a typesetted version of the handwritten elements/characters.

Figure 3:
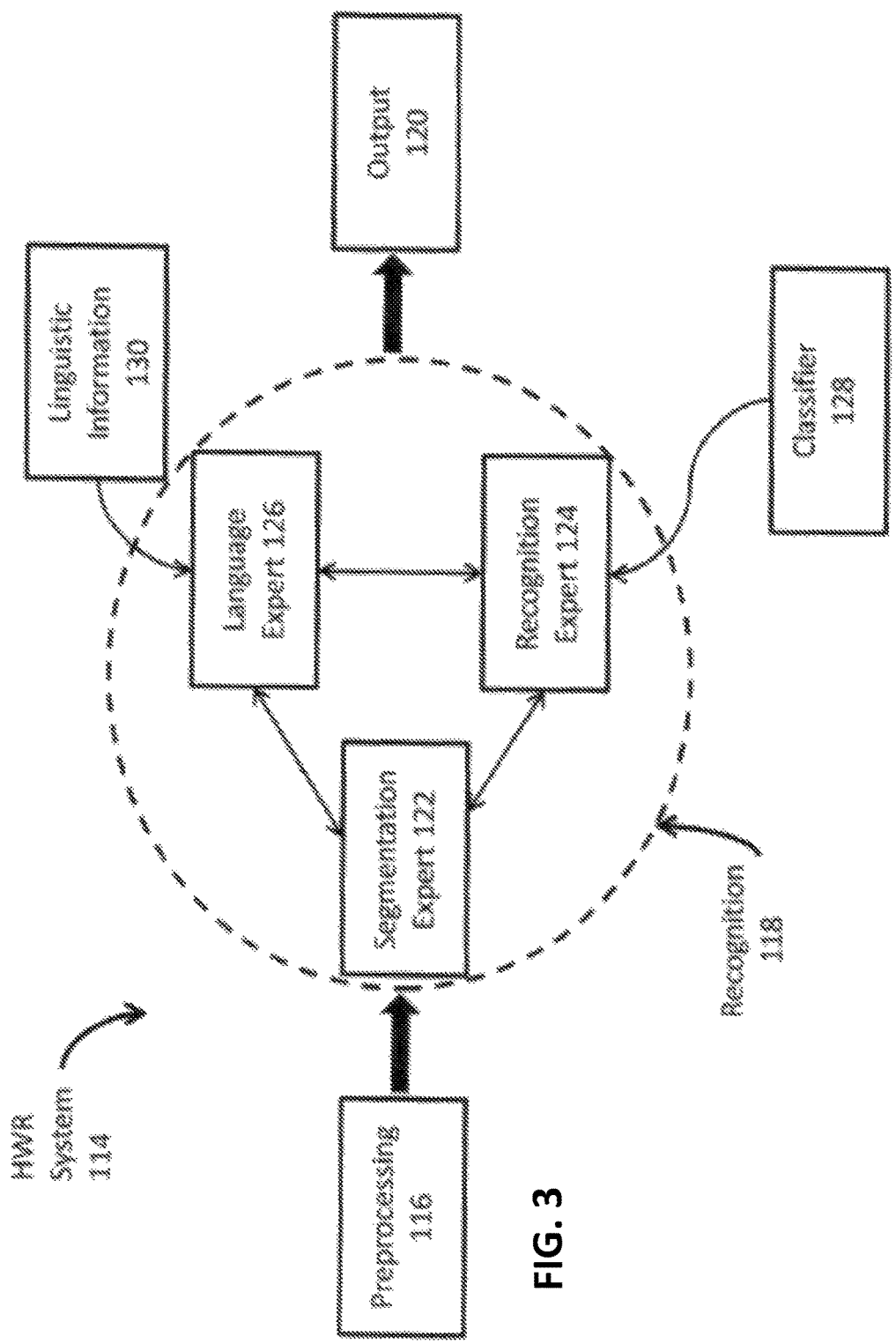
FIG. 3 shows a block diagram illustrating detail of the handwriting recognition system of FIG. 2 in accordance with an example of the present system and method.

The recognition stage 118 may include different processing elements or experts. FIG. 3 is a schematic pictorial of the example of FIG. 2 showing schematic detail of the recognition stage 118. Three experts, a segmentation expert 122, a recognition expert 124, and a language expert 126, are illustrated which collaborate through dynamic programming to generate the output 120.

The segmentation expert 122 defines the different ways to segment the input strokes into individual element hypotheses, e.g., alphanumeric characters and mathematical operators, text characters, individual shapes, or sub expression, in order to form expressions, e.g., words, mathematical equations, or groups of shapes. For example, the segmentation expert 122 may form the element hypotheses by grouping consecutive strokes of the original input to obtain a segmentation graph where each node corresponds to at least one element hypothesis and where adjacency constraints between elements are handled by the node connections. Alternatively, the segmentation expert 122 may employ separate experts for different input types, such as text, drawings, equations, and music notation.

The recognition expert 124 provides classification of the features extracted by a classifier 128 and outputs a list of element candidates with probabilities or recognition scores for each node of the segmentation graph. Many types of classifiers exist that could be used to address this recognition task, e.g., Support Vector Machines, Hidden Markov Models, or Neural Networks such as Multilayer Perceptrons, Deep, Convolutional or Recurrent Neural Networks. The choice depends on the complexity, accuracy, and speed desired for the task.

The language expert 126 generates linguistic meaning for the different paths in the segmentation graph using language models (e.g., grammar or semantics). The expert 126 checks the candidates suggested by the other experts according to linguistic information 130. The linguistic information 130 can include a lexicon, regular expressions, etc. The language expert 126 aims at finding the best recognition path. In one example, the language expert 126 does this by exploring a language model such as finite state automaton (FSA) representing the content of linguistic information 130. In addition to the lexicon constraint, the language expert 126 may use statistical information modeling for how frequent a given sequence of elements appears in the specified language or is used by a specific user to evaluate the linguistic likelihood of the interpretation of a given path of the segmentation graph.

The present system and method make use of the HWR system 114 in order to recognize handwritten input to the device 100. As discussed earlier, unlike keyboard input which is governed by strict layout rules, such as text entry on visible or invisible lines in accordance with the position of a displayed cursor, the present system and method allows handwriting to be input virtually anywhere on the input surface 104 of the computing device 100, and this input is rendered as digital ink in the input position, or in an offset position if the handwriting input is offset from the rendering position. The HWR system 114 is able to recognize this relatively 'freely' positioned handwriting. The present system and method further allows users to continue to interact with the digital ink itself and provide meaningful guidance and results of that interaction through beautifying the digital ink. Beautification is achieved by properly scaling and aligning the digital ink in accordance with an alignment structure of the input surface 104 by taking into account certain geometrical features of the handwriting (described in detail later). Interaction is assisted by the performance of segmentation of strokes in the recognition process and using information on this segmentation to allow management of an input or editing cursor that acts as a pointer for character level interactions and editing operations. These and other aspects of the present system and method are now described.

Figure 4:
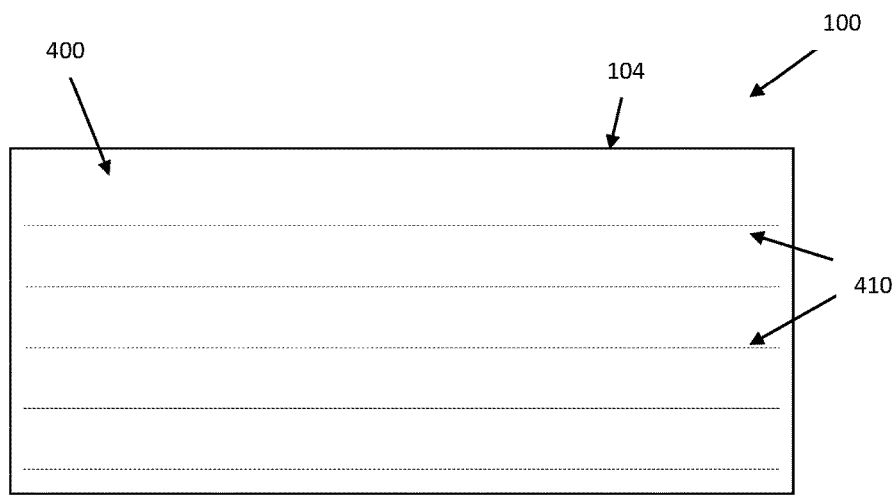
FIG. 4 shows a schematic view of an example visual rendering of an ink input area on a portion of an input surface of the computing device.

FIG. 4 shows a schematic view of an example visual rendering of an ink input or capture area 400 on a portion of the input surface 104 of an example computing device 100. The input area 400 is provided as a constraint-free canvas that allows users to create object blocks (blocks of text, drawings, etc.) anywhere without worrying about sizing or alignment. However, as can be seen an alignment structure in the form of a line pattern background 410 can be provided for guidance of user input and the alignment of digital and typeset ink objects. In any case, as users may input handwriting that is not closely aligned to the line pattern, or may desire to ignore the line pattern and write in a unconstrained manner, such as diagonally or haphazardly, the recognition of the handwriting input is performed by the HWR system 114 without regard to the line pattern. An example alignment pattern is described in United States Patent Application Publication No. 2017/0060819 titled "System and Method of Digital Note Taking" filed in the name of the present Applicant and Assignee, the entire content of which is incorporated by reference herein.

For example, from this incorporated by reference patent application, the line pattern 410 has horizontal lines separated by a multiple of the vertical rhythm height unit being the density independent pixel (dp). Regardless of the particular device 100, the vertical distance between the horizontal lines 410 is defined by a line pattern unit (LPU) and the vertical rhythm height unit provides a graduated measure of the LPU on a particular device. For example, the LPU may be set at about one centimeter for any device being a certain multiple of the vertical rhythm height unit or users may be allowed to customize the line pattern unit to a different multiple of the vertical rhythm height unit according to their writing style. Alternatively, the vertical rhythm may be based on typeset text size (e.g., the minimum text size) and the LPU is provided as a multiple of this typeset text size. All lines 410 are displayed with the same light and subtle color, e.g., grey, that is visible but faded with respect to the rendering of the content itself. In this way the line pattern is noticeable but unobtrusive so as to guide the handwriting input without distracting from the content entry.

Figure 5:
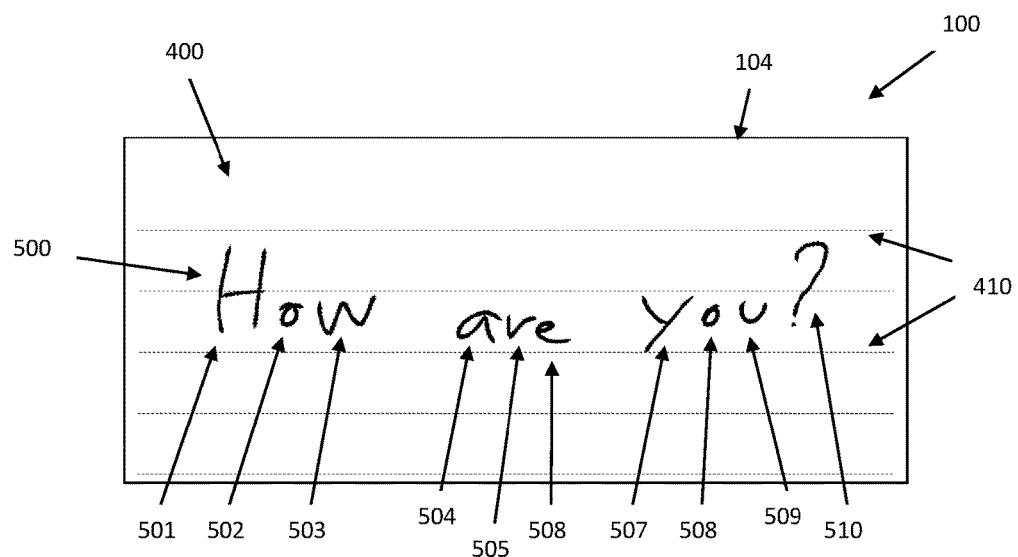
FIG. 5 shows the example input area of FIG. 4 having example handwritten input rendered as digital ink.

In order to assist user input, the application 112 can render the digital ink according to the user input in the position at which the input is made. For example, FIG. 5 shows the example input area 400 having handwritten input rendered as (first) digital ink 500. The digital ink 500 includes text characters or symbols, "H" 501, "o" 502, "w" 503, "a" 504, "r" 505, "e" 506, "y" 507, "o" 508, "u" 509 and "?" 510, forming the question phrase "How are you?". As can be seen, the input represented by the digital ink text 500 has been input by a user so as not to be in accord with the line pattern 410. That is, the characters 501 to 510 of the digital ink text 500 have not been written directly on any one of the lines 410. This input can be rendered on the line pattern however by applying a structuring transformation on the strokes of the input to beautify the digital ink through proper scaling and alignment. In order to do this appropriately information regarding the relative geometry of the digital ink text 500 is determined, such as the descending part of the handwriting, e.g., the distance between base- and mid-lines of each handwritten character, as described in detail below.

The (first) geometrical information is provided by the HWR system 114. That is, in the recognition process, the recognition engine 118 determines information on the lower and upper extrema of each character of the input to the application 112 as recognized by the HWR system 114. The lower extremum is the lowest point at which the stroke (or strokes) of the character pass. The upper extremum is the highest point at which the stroke (or strokes) of the character pass. The recognition process also determines from these extremum writing lines at the levels of character, word (e.g., a series of characters), sentence or phrase (e.g., a series of characters and/or words), and text line (e.g., a series of characters, words and/or sentences). The writing lines include top-, bottom-, base- and mid-lines.

The top-line is defined as the horizontal line passing through a point related to the upper extremum across the horizontal extent of the character, word, sentence or text line. The bottom-line is defined as the horizontal line passing through a point related to the lower extremum across the horizontal extent of the character, word, sentence or text line. The base-line is defined as the horizontal line passing through a point related to the bottom-line across the horizontal extent of the character, word, sentence or text line, and the mid-line is defined as the horizontal line passing through a point related to the top- and base-lines across the horizontal extent of the character, word, sentence or text line. The determination of the points through which these lines pass is particular to the recognition process and language model(s) used by the HWR system 114.

For example, for languages having all characters and words made from those characters in a sentence or phrase written with a similar vertical extent, such as pictographic languages, for characters within a word, sentence or text line, the character having the highest upper extrema may be used as the point for either (or both) the top- or mid-line, and the character having the lowest lower extrema may be used as the point for the either (or both) bottom- and base-line, for example.

On the other hand, for languages having characters or letters written in a sentence or phrase with different sizes, such as Latin-based languages, e.g., upper and lower casing, letters with ascenders and/or descenders (e.g., "h", "g"), diacritics (e.g., "i", "j") and punctuation symbols (e.g., "?"), for characters within a word, sentence or text line, the character having the highest upper extrema may be used as the point for the top-line, the character having the lowest lower extrema may be used as the point for the bottom-line, the character having the lowest lower extrema of characters which do not have a descender may be used as the point for the base-line, and the lower case character having the highest upper extrema of lower case characters which do not have an ascender may be used as the point for the mid-line, for example.

Alternatively, instead of setting the writing lines on absolute values, average or mean values can be taken, such as the average or mean of the lower and upper extrema across the text line, sentence or words, or the strokes of the characters themselves, so that local variations and anomalies, such as unduly offset characters, are not given undesired weight.

Figure 6:
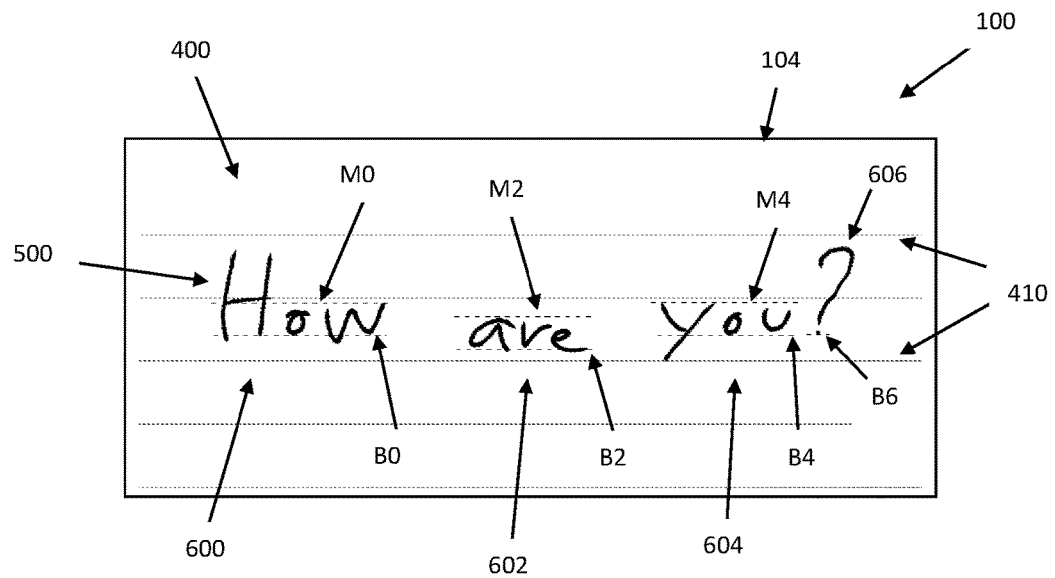
FIG. 6 shows the example digital ink of FIG. 5 with geometrical information provided by the handwriting recognition system.

FIG. 6 shows the example input of FIG. 5 with the above-described geometrical information of the base- and mid-(or top-)lines provided by the HWR system 114 illustrated. That is, the characters 501-503 are recognized as belonging to one word 600, e.g., "How", with base-line B0 and mid-line M0 determined for the word 600, the characters 504-506 are recognized as belonging to one word 602, e.g., "are", with base-line B2 and mid-line M2 determined for the word 602, the characters 507-509 are recognized as belonging to one word 604, e.g., "you", with base-line B4 and mid-line M4 determined for the word 604, and the character 510 is recognized as being a single symbol 606, with base-line B6 determined for the symbol 606. The present system and method uses the geometrical information to provide a structuring transformation through proper scaling and alignment of the strokes of the input as follows.

The structuring transformation uses a ratio which is the minimum between a number of different ratio values related to comparisons of (second) geometrical information of the line pattern 410 and the (first) geometrical information of the input at character, word, sentence or text line level. The level at which first, second and third ratios (described below) are all determined may be, for example, pre-determined or settable via the UI of the application 112. In the examples discussed herein, the word level is depicted, but it is understood that similar description is applicable to the other levels.

Figure 7:
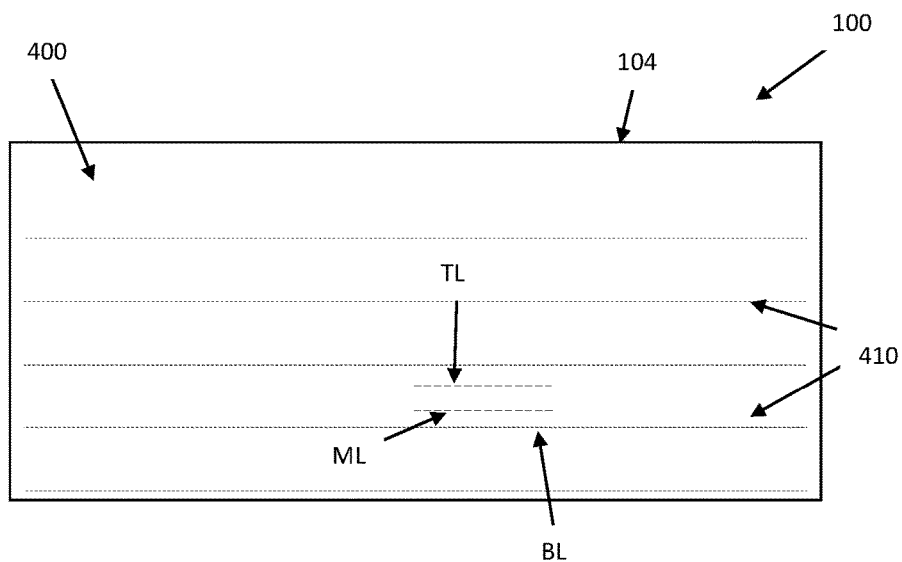
FIG. 7 shows the example input area of FIG. 4 with geometrical information provided by the handwriting recognition system.

The geometrical information of the line pattern 410 is determined by the application and includes top-, base- and mid-lines, as shown in FIG. 7. For example, the base-line BL of each line 410 of the line pattern is defined as that line 410, the top-line TL of each line 410 is defined as being at an (first) offset vertical distance from the base-line BL of that line 410 (e.g., between about 60% and about 80% of the LPU), and the mid-line ML of each line 410 is defined as being at an (second) offset vertical distance from the base-line BL (and/or top-line TL) of that line 410 (e.g., between about 30% and about 70% of the distance between the base-line BL and top-line TL). In this way, sufficient space for ascenders and descenders, upper casing, and grammatical symbols is provided once the digital ink has been scaled onto the line pattern 410.

A first ratio value is the ratio of the (first) distance (i.e., height) of the line pattern, i.e., one LPU, and the (first) distance (i.e., height) of each word of the input. The height of a word is defined as the vertical extent between the bottom-line and top-line of that word. A similar definition is applicable to the character level, as these are like words having a single character, such as the symbol 606. For sentences and text lines the height may be determined from the absolute values for the extrema, i.e., the lowest lower extremum and the highest upper extremum, and/or from the base- and top-lines, which may or may not be based on average, mean or adjusted (e.g., upper case or ascender/descender characters discarded) values.

Thus, in the example of FIG. 6, the height of the word 600 is from the highest point of the word, being the highest point of the character 501, to the lowest point of the word, being the lowest point of the character 503, the height of the word 602 is from the highest point of the word (e.g., the highest point of the character 504) to the lowest point of the word, (e.g., the lowest point of the character 508), the height of the word 604 is from the highest point of the word (e.g., the highest point of the character 507) to the lowest point of the word (e.g., the lowest point of the character 507), and the height of the symbol 606 is from the highest point of the character 510 to the lowest point of the character 510, for example. The first ratio of each word therefore provides a comparison of the total height of that word, as set by the characters of the word (i.e., including casing, ascenders, descenders and grammatical symbols), and the LPU.

A second ratio value is the ratio of the (second) distance (e.g., top height) from the base-line BL to the top-line TL of the line pattern 410 and the (second) distance (e.g., top height) from the base-line to the top-line of each word of the input. Thus, in the example of FIG. 6, the top height of the word 600 is from the top-line of the word (e.g., passing through the highest point of the character 501) to the base-line B0, the top height of the word 602 is from the top-line of the word (e.g., passing through the highest point of the character 504) to the base-line B2, the top height of the word 604 is from the top-line of the word (e.g., passing through the highest point of the character 507) to the base-line B4, and the top height of the symbol 606 is from the top-line of the symbol 606 (e.g., passing through the highest point of the character 510) to the base-line B6. The second ratio of each word therefore provides a comparison of the top-line to base-line height of that word and the top-line height of the lines 410.

The third ratio is the ratio of the (third) distance (e.g., mid height) from the base-line BL to the mid-line ML of the line pattern 410 and the (third) distance (e.g., mid height) from the base-line to the mid-line of each word of the input. Thus, in the example of FIG. 6, the mid height of the word 600 is from the mid-line M0 to the base-line B0, the mid height of the word 602 is from the mid-line M2 to the base-line B2, the mid height of the word 604 is from the mid-line M4 to the base-line B4, and the mid height of the symbol 606 is from the mid-line of the symbol 606 (e.g., the same as the top-line) to the base-line B6. The third ratio of each word therefore provides a comparison of the mid-line to base-line height of that word and the mid-line height of the lines 410.

Two or more of these ratios are compared in order to determine the minimum value. For example, the first and second ratios may be compared, or the first and third, or the second and third, or all three ratios. Further, other ratios may be determined and used in the comparison. The comparison allows a minimum character, word, sentence or text line size to be used for the structuring transformation. In the structuring transformation, the rendered strokes of the scaled digital ink are the smallest compared to the original input. However, if the minimum value of each compared ratio is greater than 1, then the returned minimum value is capped at 1, such that no scaling is performed. This especially applies to some punctuation marks which do not require scaling, such as periods.

Figure 8:
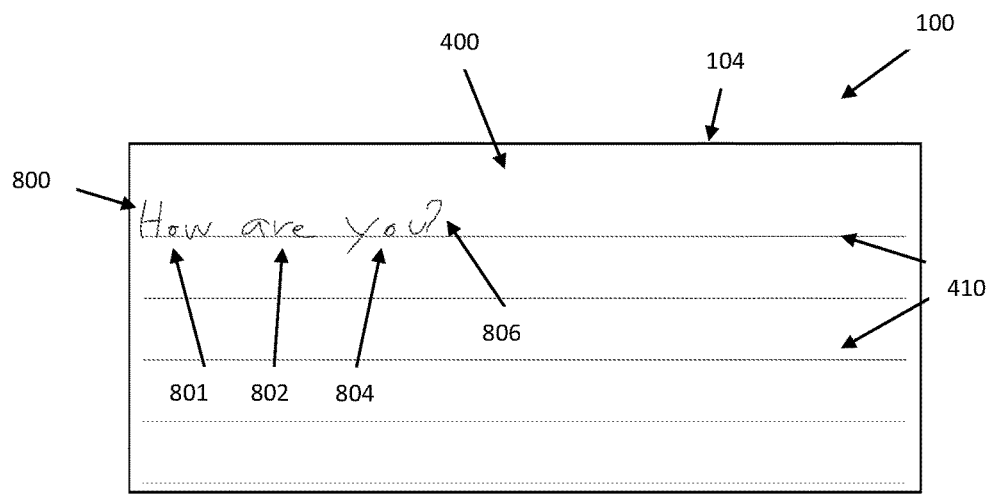
FIG. 8 shows example beautified digital ink rendered on a line pattern.

Once the comparison is made, the elements of the (non-scaled or original) digital ink (e.g., the characters, words, etc. depending on the level used for the comparison) are scaled by the minimum value and are rendered on one of the lines 410 of the line pattern so that the base-line of the scaled element is at the base-line of that line 410 (i.e., on the line 410). FIG. 8 shows an example in which the minimum ratio values for each of the words 600 to 606 of the digital ink 500 are determined from a comparison of the first, second and third ratios described above in order to perform the structuring transformation of the digital ink 500 to structured (second) digital ink 800. The structured digital ink text 800 includes a word 801 being the scaled version of the word 600, a word 802 being the scaled version of the word 602, a word 804 being the scaled version of the word 604, and a word 806 being the scaled version of the word 606. The structured digital ink text 800 is rendered on the uppermost (first) line of the line pattern 410 so that the base-line of each scaled word 801 to 806 is positioned in the first line 410.

The HWR system 114 may have some issues with determining the base-lines of elements of the input since there may be many ambiguities leading to improbable base-line recognition. Accordingly, the application 112 may be configured to handle the translation of the scaled strokes depending on the elements/characters that are recognized by the HWR system 114. For example, the HWR system 114 may not be able to set a base-line for a single horizontal line recognized as a hyphen or minus sign, accordingly the application 112 may display the scaled strokes with an offset from the line 410, such as to be centered vertically in the line pattern of the rendering area.

The positioning of each element on the multiple lines of the line pattern 410 is made based on certain pre-defined or settable criteria, such as, for left-to-right written languages, aligned to the first available left-most section of a first available line from the top of the rendering area of the device 100 which can accommodate the scaled element. For example, in the example of FIG. 8, the rendering area is overlapped or coextensive with the input area 400 such that the scaled digital ink text 800 is left-aligned on the first line 410, since there is no other content (e.g., digital or typeset ink) displayed on any of the lines 410. Another example of criteria for positioning of the transformed ink can be the usage of a cursor as an insertion point of the new input, e.g., allowing users to complete previous inputs (described in detail later). Such positioning may therefore include reflowing of the input over multiple ones of the lines 410, for example, if the next available position is on a line which is below the line previously used for the structured digital ink. In this way, paragraphs of text can be formed from a series of inputs of single lines of text (input as described below) and editing operations can be performed on the structured digital ink including those that trigger reflowing events (as described later).

With respect to the input and rendering areas or zones of the application 112, it is noted that these areas may be coextensive, as in the example of FIG. 8, such that once input has been received and displayed/rendered as the original digital ink (e.g., the digital ink 500) after a set amount of time, as measured by a clock of the computing device 100 in conjunction with the memory 108 for example, the input area is cleared of the original digital ink and the structured digital ink (e.g., the digital ink 800) is displayed/rendered on the rendering area. Alternatively, the input and rendering areas may be separated into different zones of the interface 104 or on separate displays or display devices, such that display of the original digital ink may persist and be scrolled, for example, to allow further input, or be omitted after a certain time period or receipt of new input. For example, superimposed input in which characters or words or parts of words are input over the top of one another with fading or other omission of previously entered input may be possible in either case of separated or overlapped display, such as described in United States Patent Publication No. 2015/0286886 filed in the name of the present Applicant and Assignee and United States Patent Publication No. 2015/0356360 filed in the name of the present Applicant and Assignee, the entire contents of which are incorporated by reference herein.

Further, in the structuring transformation, the spaces between characters and between words in the input are transformed to a fixed spacing, such as shown in FIG. 8. The fixed spacing may be set based on the LPU (e.g., about 5% to about 15% of the LPU) or the mid-line height of the line pattern (e.g., about 40% to about 60% of the mid height), or on other criteria. The fixed spacing is provided so that generally normalized and beautified digital ink output is provided aligned to the line pattern, particularly with respect to the above-mentioned new input which may be rendered as scaled digital ink on the same line as previously scaled input. Alternatively, the spacing between the characters/words of the input may be scaled in relation to the scaling of the associated characters/words.

Figure 9:
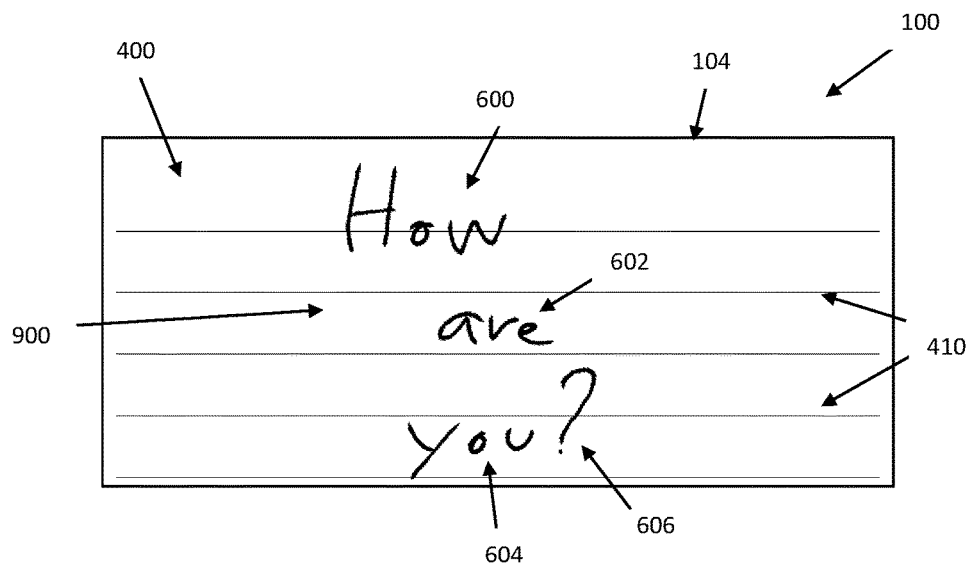
FIG. 9 shows the example input area of FIG. 4 having example handwritten input rendered as digital ink.
Figure 10:
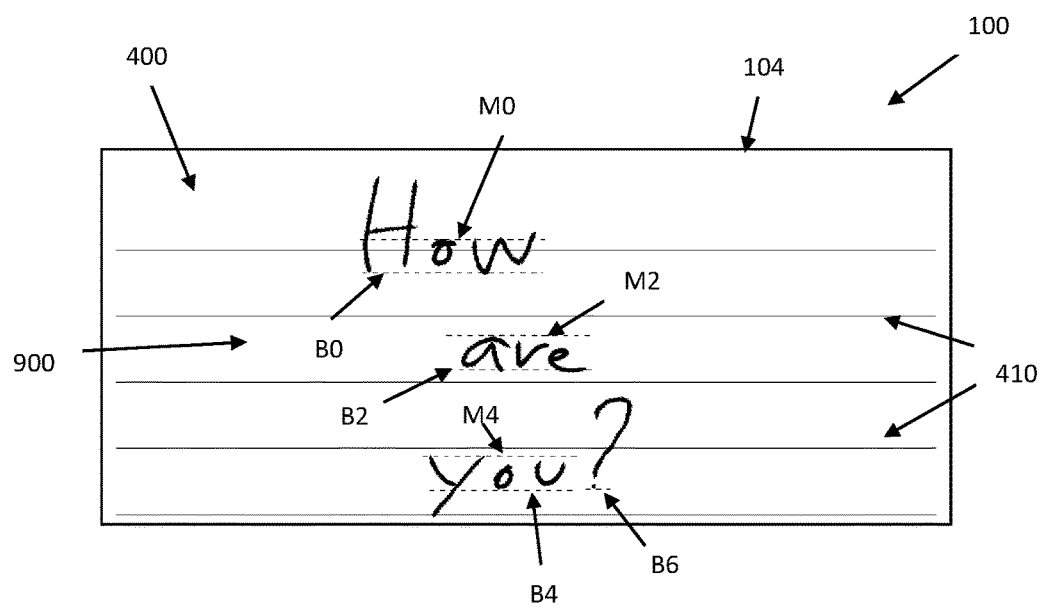
FIG. 10 shows the example digital ink of FIG. 9 with geometrical information provided by the handwriting recognition system.

The above-discussed example includes input which is generally horizontally provided in the left-to-right (or right-to-left) written context. However, as is understood as the geometry of elements of the input text, such as words, are considered for the structuring transformation, other manners of input are also handled by the present system and method. For example, FIG. 9 shows the example input area 400 having handwritten input rendered as digital ink text 900. The digital ink text 900 includes the 'words' 600, 602, 604 and 606, as in the above-described example, however these words are vertically input so that the word 600 is above the other words, the word 602 is above the words 604 and 606, and the words 604 and 606 are on the same text line. As such the digital ink 900 is on multiple text lines which are not aligned with any of the lines 410. As with the aforedescribed examples, the base-line B0 and mid-line M0 are determined for the word 600, the base-line B2 and mid-line M2 are determined for the word 602, the base-line B4 and mid-line M4 are determined for the word 604, and the base-line B6 is determined for the symbol 606, as shown in FIG. 10. Thus, as the geometrical information is the same, the structuring transformation is the same as described earlier, such that the non-structured digital ink 900 is transformed into the scaled and aligned digital ink 800 shown in FIG. 8. As can be understood, similar transformation can be applied to other alignments and manners of inputting the handwriting.

Figure 11:
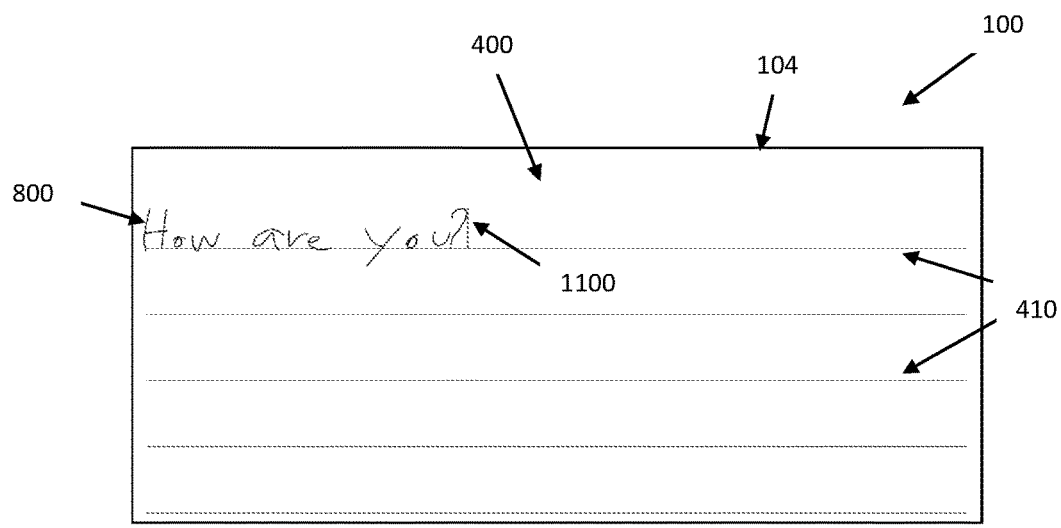
FIG. 11 shows the example beautified digital ink of FIG. 8 with a cursor.

The beautification of the non-beautified or 'raw' digital ink according to the handwritten input to the device 100 into the beautified digital ink provides a way of displaying user handwritten input in a normalized and standard fashion thereby aiding legibility, usability and interactability with the content. It is considered that guidance for users for such interactions with the beautified digital ink using mechanisms similar to those expected in document processing applications is beneficial, as this enhances the user experience with the application 112. One such mechanism is the use of an input or editing cursor that acts as a pointer for character level editing operations, such as carriage return, space insertion, character deletion or insertion. For example, FIG. 11 shows a cursor 1100 provided after the beautified digital ink 800.

It is understood that beyond guiding handwritten interaction with the beautified content, the cursor also provides positioning of other forms of input, such as typing via keyboard or text input by voice recognition. As can be seen, the cursor 1100 is displayed with sizing and alignment similar to the structured digital ink. The cursor may be displayed by the application 112, and editing functions performed, in response to user interaction with the digital ink within the rendering or editing area. This interaction may be through known gestures on touch and hover devices (such as tap, double tap, press, long press, swipe, pinch), specific digital ink editing gestures (such as those described in European Patent Application No. 15 290 296.1 and U.S. patent application Ser. No. 14/989,217 both titled "System and Method for Note Taking with Gestures" and both filed in the name of the present Applicant and Assignee, the entire contents of which are incorporated by reference herein), or hardware tools (such as keyboard, mouse). Alternatively, or additionally, the cursor may be displayed by the application 112 in a (set) default position, such as at the end of the (most recent) beautified digital ink (e.g., as shown in FIG. 11), for example, once the digital ink has been beautified. The cursor remains displayed, for example, until new handwriting input is detected by the application 112.

Figure 12:
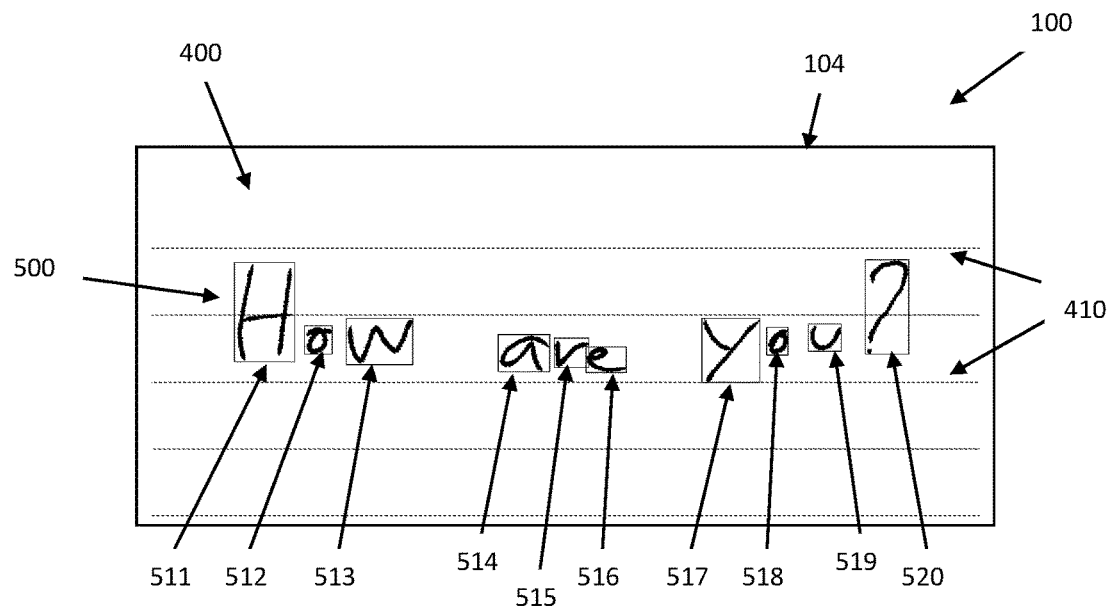
FIG. 12 shows the example digital ink of FIG. 5 with character bounding boxes determined from character segmentation of the example handwritten input provided by the handwriting recognition system.

As mentioned earlier, the present system and method provides the cursor management through segmentation in the recognition process. This aspect of the present system and method is now described. As discussed above, segmentation is performed by the HWR system 114 during the recognition process. This segmentation information is retrieved by the application 112 to determine the ranges of each recognized element within the handwritten input, such as for example, characters of handwritten text, shapes of handwritten drawings, etc. For example, FIG. 12 shows the determined ranges, illustrated as character bounding boxes 511 to 520 for an example segmentation of the characters 501 to 510 of the input, respectively. The present system and method uses these ranges to display the cursor at the bounding box of each character. For example, in FIG. 11 the cursor 1100 is displayed at the right edge of the bounding box 520 of the character 510.

However, unlike typeset or fontified ink, digital ink, even the beautified digital ink, is not regularly provided on a character-by-character basis. This is because, handwriting is a form of personal font of the writing user, and while basic standards are followed in handwritten languages, many variations will exist. As such, many of the characters will overlap horizontally, or vertically, or both, due to capitalization, ascenders, descenders, slanted writing, or just untidy handwriting. While character overlap is handled by the HWR system 114 to properly recognize the characters, the character positions themselves are not adjusted through the segmentation or the beautification described above. Such adjustment could be made, but it is difficult to provide general rules because as stated above, the manner of handwriting is very personal. Accordingly, character overlap causes overlap of the bounding boxes. For example, as can be seen in FIG. 12 the bounding boxes 515 and 516 overlap dues to overlap of the characters 505 and 506. As such, rendering a cursor on an overlapped bounding box may cause confusion for users. Examples of how the present system and method handle this situation is described below in relation to FIGS. 13 to 18.

Figure 13:
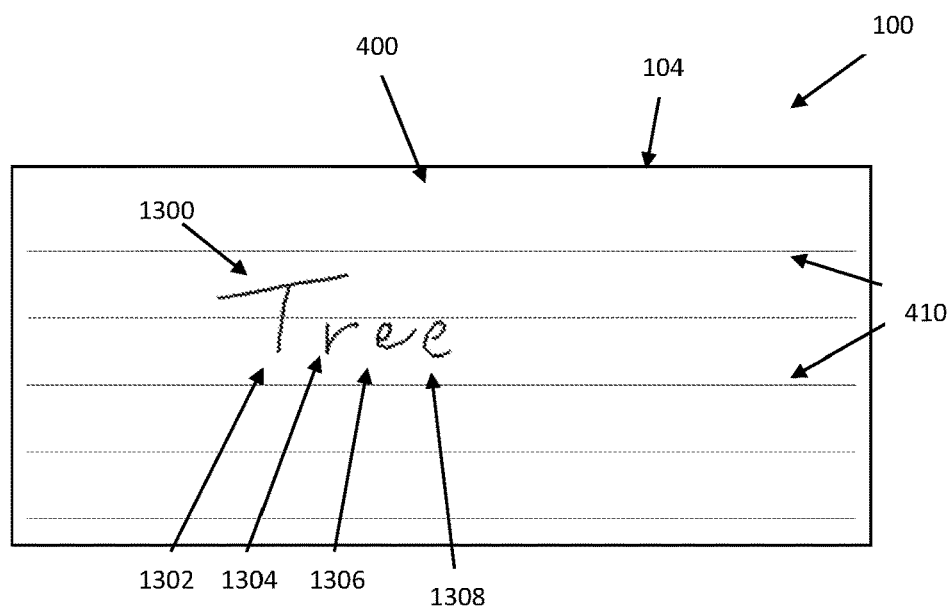
FIG. 13 shows the example input area of FIG. 4 having example handwritten input rendered as digital ink.
Figure 14:
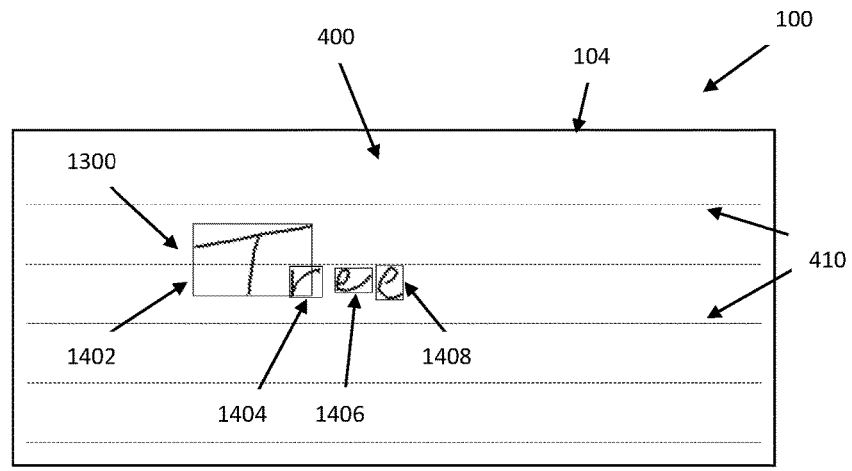
FIG. 14 shows the example digital ink of FIG. 13 with character bounding boxes determined from character segmentation of the example handwritten input provided by the handwriting recognition system.

FIG. 13 shows the example input area 400 having handwritten input rendered as digital ink text 1300. The digital ink text 1300 includes the characters or symbols, "T" 1302, "r" 1304, "e" 1306, and "e" 1308 forming the capitalized word "Tree". As before, the input represented by the digital ink text 1300 has been input by a user so as not to be in accord with the line pattern 410. FIG. 14 shows the digital ink text 1300 with the determined ranges of each character as segmented by the HWR system 114 illustrated as bounding boxes 1402 to 1408 corresponding to the characters 1302 to 1308, respectively.

Figure 15:
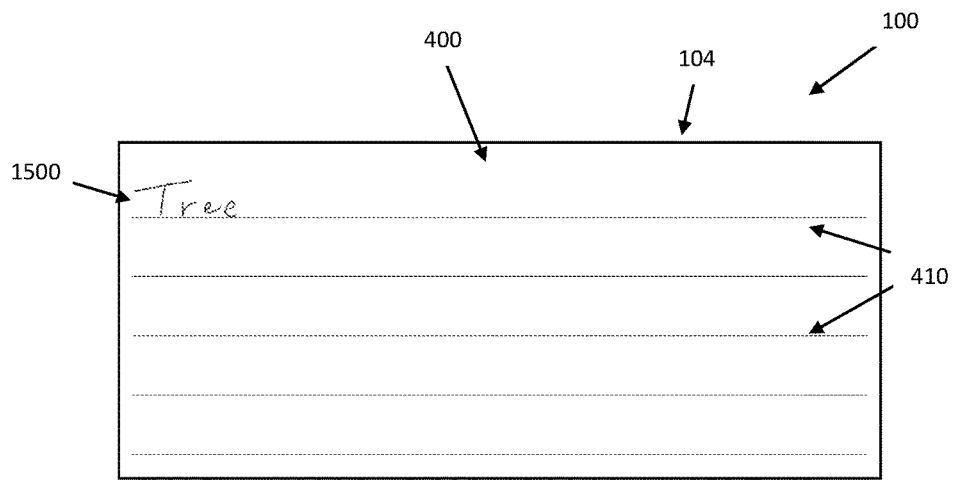
FIG. 15 shows example beautified digital ink rendered on the line pattern.
Figure 16:
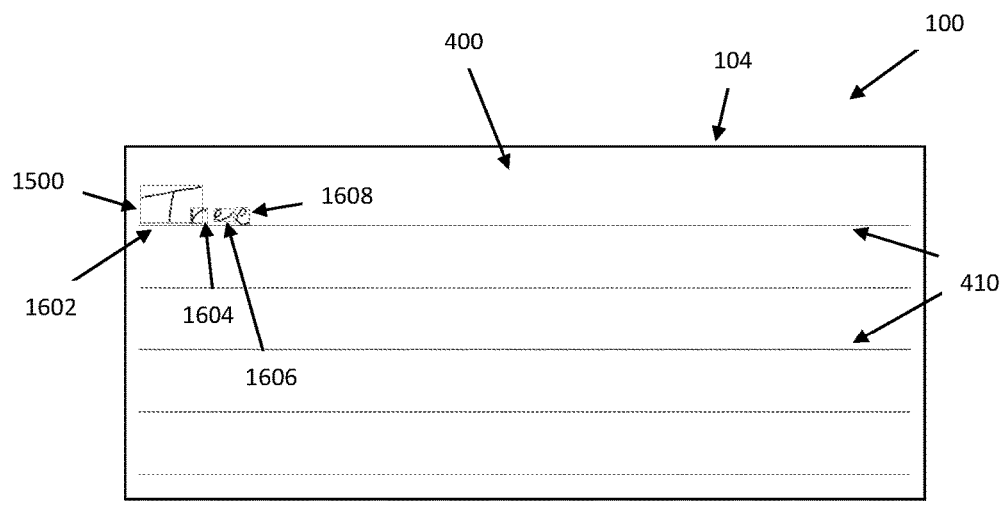
FIG. 16 shows the example beautified digital ink of FIG. 15 with character bounding boxes determined from character segmentation of the example handwritten input provided by the handwriting recognition system.

FIG. 15 shows the digital ink 1300 of FIG. 13 after the structuring transformation to produce scaled digital ink 1500 which is properly aligned with the line pattern 410 by the earlier described criteria. It is understood that since the beautified digital ink of the present example is a scaled and aligned version of the 'raw' digital ink without adjustment within words, such as inter-character spacing and character sizing, the structuring transformation is equally applicable to the ranges of the characters as segmented. Thus, as shown in FIG. 16, the bounding boxes 1402 to 1408 of the digital ink 1300 are scaled to bounding boxes 1602 to 1608, respectively, for the structured digital ink 1500. These scaled bounding boxes are therefore used by the application 112 to set the cursor position through consideration of geometrical features of the bounding boxes in one or more of the following ways.

Figure 17A:
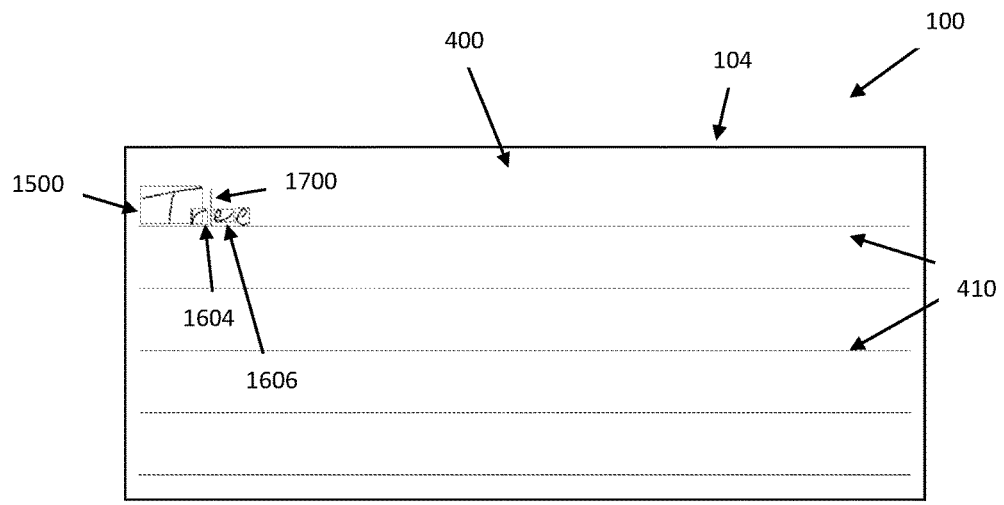
FIG. 17A shows a first example cursor position for non-overlapping characters of the example beautified digital ink of FIG. 15.

In the case that the ranges of two consecutive characters do not overlap, several strategies can be applied by the present system and method in order to place the cursor:

The cursor is positioned between those two characters at the center between the range borders. For example, FIG. 17A shows a centered (first) cursor 1700 positioned in the center between the bounding boxes 1604 and 1606 of the non-overlapping respective (first) character 1304 and (second) character 1306.

Figure 17B:
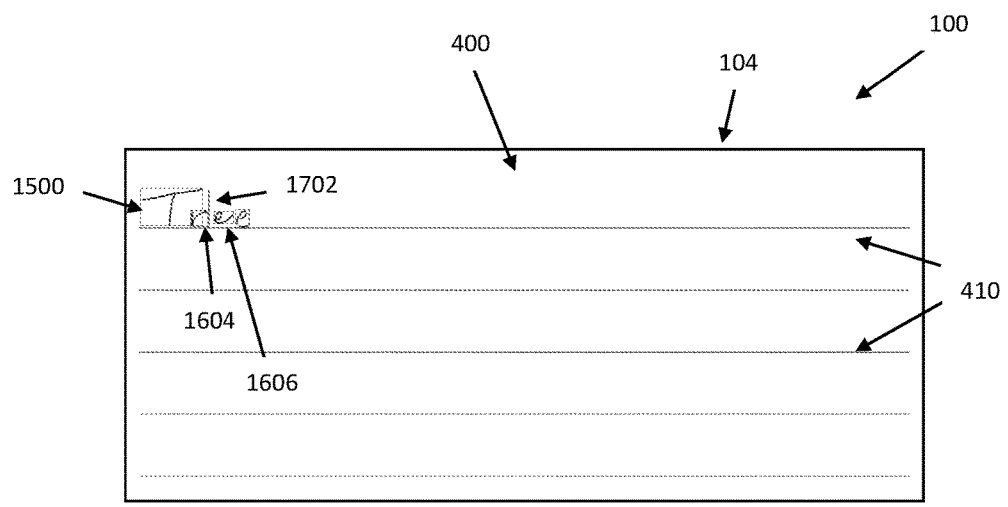
FIG. 17B shows a second example cursor position for non-overlapping characters of the example beautified digital ink of FIG. 15.

The cursor is positioned between those two characters at the right range border of the left-side character. For example, FIG. 17B shows a left-aligned (second) cursor 1702 positioned on the right edge of the bounding box 1604 of the character 1304 between the non-overlapping characters 1304 and 1306.

Figure 17C:
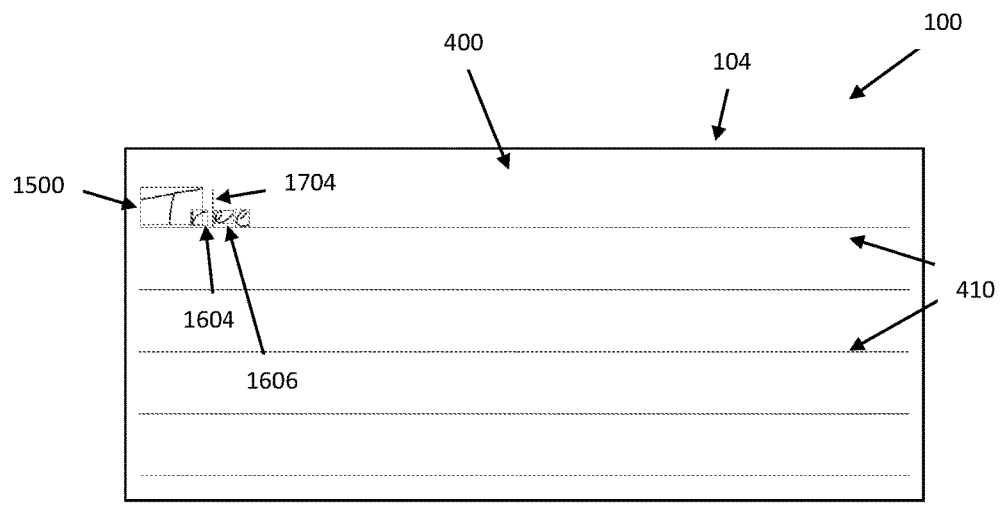
FIG. 17C shows a third example cursor position for non-overlapping characters of the example beautified digital ink of FIG. 15.

The cursor is position between those two characters at the left range border of the right-side character. For example, FIG. 17C shows a right-aligned (third) cursor 1704 positioned on the left edge of the bounding box 1606 of the character 1306 between the non-overlapping characters 1304 and 1306.

Figure 18A:
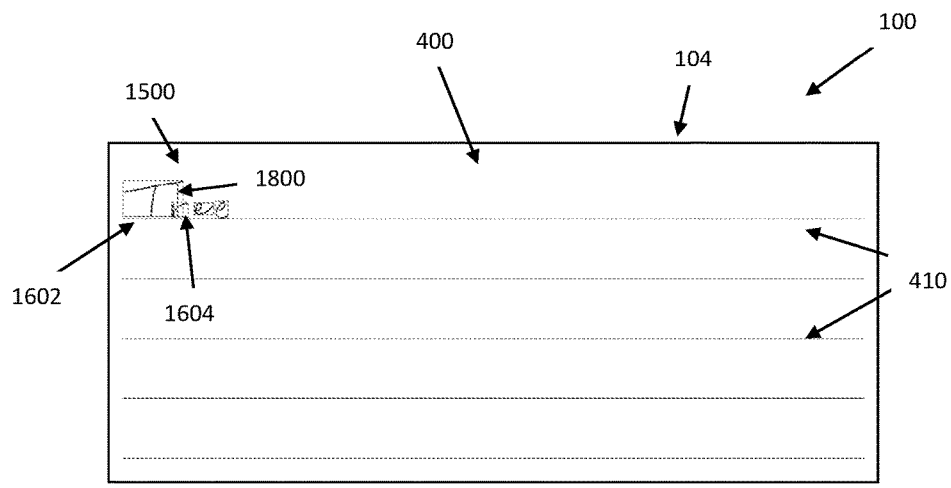
FIG. 18A shows a fourth example cursor position for overlapping characters of the example beautified digital ink of FIG. 15.

Whereas, in the case that the ranges of two consecutive characters do overlap, several strategies can be applied by the present system and method in order to place the cursor:

The cursor is positioned between those two characters at the center of the area of overlap defined by the ranges of the overlapped characters. For example, FIG. 18A shows a centered (fourth) cursor 1800 positioned in the center of the overlapping area of the (first) character 1302 and (second) character 1304. As can be seen however, this setting may cause confusion for users as to which character the cursor 1800 is related.

Figure 18B:
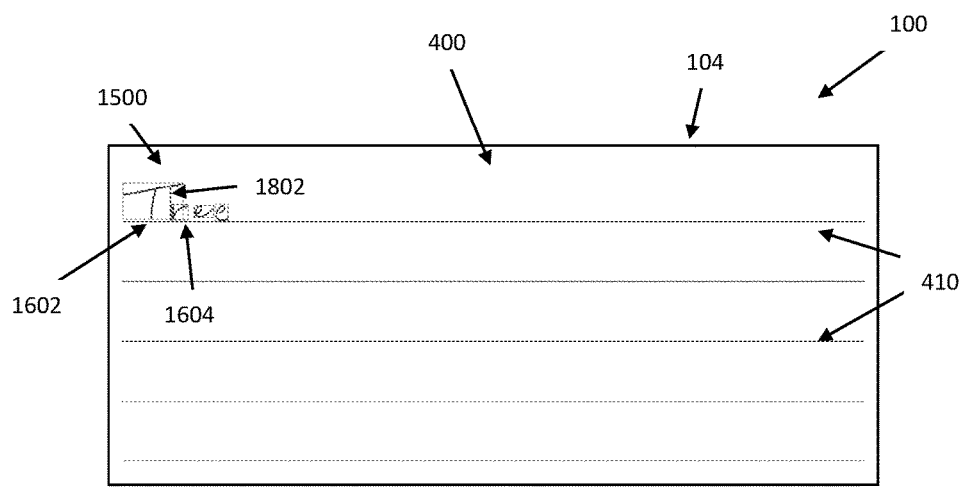
FIG. 18B shows a fifth example cursor position for overlapping characters of the example beautified digital ink of FIG. 15.

The cursor is positioned between those two characters in consideration of the other geometrical features of the ranges of the overlapped characters, such as the height, the width, or the area of the bounding boxes to be at the range border of the character with either the smallest or the highest value of these geometrical features which is in the overlapping area. For example, FIG. 18B shows a left-aligned (fifth) cursor 1802 positioned on the left edge of the bounding box 1604 of the character 1304 between the overlapping characters 1302 and 1304, where the character having the bounding box of smallest height is used as the cursor positioning criteria.

As with any document editing application, the cursor position can be set and reset by user interaction within the editing area, such as with a tap or a click, provided by the application 112, as discussed earlier. However, in the aforedescribed example of the present system and method in which the input or capture area and the rendering or editing area are overlapped, the receipt of a gesture may cause ambiguity between setting of the cursor position and the input of new content. The present system and method accounts for such ambiguity to identify a 'set cursor position' action by evaluating certain criteria with respect to received user interaction. For example, when:

the input is constituted by a unique stroke, until the end of the writing session; and the new input is a single-point gesture, such as a tap or other unique sampling point, defining a user interaction point; and content, such as a character or word, is present in the rendering area at the user interaction point, then:

the user interaction is considered as a request to set the cursor position.

The present system and method properly beautifies 'freely' (unstructured) input digital ink through scaling or minimizing and aligning the digital ink on alignment elements of an editing area by taking into account the relative geometrical information of the handwriting, such as the descending part of the handwriting, e.g., the distance between the base-line and the mid-line of the handwriting as determined by the recognition process for recognizing the handwriting input. Further, the present system and method considers character segmentation determined by the recognition process for recognizing the handwriting input to allow management of an editing cursor position for the beautified digital ink so that editing operations can be performed on a character basis, and not only on a word, sentence, line or block basis, for example.

While the foregoing has described what is considered to be the best mode and/or other examples, it is understood that various modifications may be made therein and that the subject matter disclosed herein may be implemented in various forms and examples, and that they may be applied in numerous other applications, combinations, and environments, only some of which have been described herein. Those of ordinary skill in that art will recognize that the disclosed aspects may be altered or amended without departing from the true spirit and scope of the subject matter. Therefore, the subject matter is not limited to the specific details, exhibits, and illustrated examples in this description. It is intended to protect any and all modifications and variations that fall within the true scope of the advantageous concepts disclosed herein.

We claim:

1. A system for providing editing of digital ink on computing devices, each computing device comprising a processor and at least one non-transitory computer readable medium for recognizing handwriting input under control of the processor, the at least one non-transitory computer readable medium configured to:

cause display of, on a display interface of a computing device, digital ink in accordance with the handwriting input;

determine, from segmentation information of the handwriting input determined through the recognition of the handwriting input, ranges of elements of the digital ink;

cause display of, on the display interface, an input cursor in relation to the determined digital ink element ranges; and cause said display of the input cursor within a region of overlap of ranges of elements of the digital ink determined in the step of determining ranges of elements of the digital ink.

2. A system according to claim 1, wherein the elements of the digital ink include text characters, the at least one non-transitory computer readable medium configured to display the input cursor at a position between first and second characters in relation to the determined ranges of the first and second characters.

3. A system according to claim 1, wherein the geometrical features include height and width of the determined ranges.

4. A method for providing editing of digital ink on computing devices, each computing device comprising a processor and at least one non-transitory computer readable medium for recognizing handwriting input under control of the processor, the method comprising:

displaying, on a display interface of a computing device, digital ink in accordance with the handwriting input;

determining, from segmentation information of the handwriting input determined through the recognition of the handwriting input, ranges of elements of the digital ink;

displaying, on the display interface, an editing cursor in relation to the determined digital ink element ranges; and causing said display of the editing cursor within a region of overlap of ranges of elements of the digital ink determined in the step of determining ranges of elements of the digital ink.

5. A method according to claim 4, wherein the elements of the digital ink include text characters, the input cursor being displayed at a position between first and second characters in relation to the determined ranges of the first and second characters.

6. A method according to claim 4, wherein the geometrical features include height and width of the determined ranges.

7. A non-transitory computer readable medium having a computer readable program code embodied therein, said computer readable program code adapted to be executed to implement a method for providing editing of digital ink on a computing device, the computing device comprising a processor and at least one system non-transitory computer readable medium for recognizing handwriting input under control of the processor, the method comprising:

displaying, on a display interface of a computing device, digital ink in accordance with the handwriting input;

determining, from segmentation information of the handwriting input determined through the recognition of the handwriting input, ranges of elements of the digital ink;

displaying, on the display interface, an editing cursor in relation to the determined digital ink element ranges; and causing said display of the editing cursor within a region of overlap of ranges of elements of the digital ink determined in the step of determining ranges of elements of the digital ink.

8. A non-transitory computer readable medium according to claim 7, wherein the elements of the digital ink include text characters, the input cursor being displayed at a position between first and second characters in relation to the determined ranges of the first and second characters.

9. A non-transitory computer readable medium according to claim 7, wherein the geometrical features include height and width of the determined ranges.

* * * * *